United States Patent
Kasai (10) Patent No.: US 9,045,010 B2
(45) Date of Patent: Jun. 2, 2015

(54) MOTORCYCLE TIRE

(75) Inventor: Katsumi Kasai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 1079 days.

(21) Appl. No.: 12/907,582

(22) Filed: Oct. 19, 2010

(65) Prior Publication Data

US 2011/0132509 A1  Jun. 9, 2011

(30) Foreign Application Priority Data

Dec. 8, 2009 (JP) .................................. 2009-278853

(51) Int. Cl.
*B60C 11/03* (2006.01)
*B60C 11/00* (2006.01)

(52) U.S. Cl.
CPC ..... *B60C 11/0302* (2013.04); *B60C 2011/0374* (2013.04); *B60C 11/0083* (2013.04); *B60C 11/0306* (2013.04); *B60C 11/0332* (2013.04); *B60C 2200/10* (2013.04); *B60C 11/033* (2013.04); *B60C 2011/0383* (2013.04); *B60C 2011/0381* (2013.04); *B60C 2011/0372* (2013.04)

(58) Field of Classification Search
CPC ..................... B60C 11/033; B60C 2011/0372; B60C 2011/0381; B60C 11/0302; B60C 11/0332; B60C 2011/0383; B60C 2011/0374
USPC ............................. 152/209.11, 209.14, 209.28
See application file for complete search history.

(56) References Cited

U.S. PATENT DOCUMENTS

| | | | | |
|---|---|---|---|---|
| 4,388,960 A | * | 6/1983 | Wada et al. ............. | 152/209.11 |
| 6,220,320 B1 | * | 4/2001 | Nakagawa et al. ....... | 152/209.11 |
| D455,115 S | * | 4/2002 | Steinbach .................... | D12/535 |
| D571,710 S | * | 6/2008 | Shibamoto et al. .......... | D12/535 |
| D604,225 S | * | 11/2009 | Shibamoto ................... | D12/535 |
| 8,011,403 B2 | * | 9/2011 | Nakagawa ............... | 152/209.11 |
| 2006/0130949 A1 | * | 6/2006 | Nakamura ............... | 152/209.11 |
| 2006/0207701 A1 | | 9/2006 | Tanaka | |
| 2006/0219342 A1 | * | 10/2006 | Steinbach ................ | 152/209.11 |

FOREIGN PATENT DOCUMENTS

| | | | | |
|---|---|---|---|---|
| EP | | 368553 A2 | * | 5/1990 |
| EP | | 1946942 A1 | * | 7/2008 |
| WO | WO-2009/013961 A1 | | * | 1/2009 |

* cited by examiner

*Primary Examiner* — Steven D Maki
(74) *Attorney, Agent, or Firm* — Birch, Stewart, Kolasch & Birch, LLP (57) ABSTRACT

A motorcycle tire comprises a tread portion having a tread width between tread edges. The tread portion is provided with a crown oblique groove disposed within a center region of the tread portion is defined as having 30% of the tread width. The center region having a radius of curvature of from 0.60 to 0.75 times the tread width in a meridian section of the tire, and the center region has a land ratio in a range of from 0.75 to 0.95. The crown oblique groove extends continuously or discontinuously in the tire circumferential direction, across the tire equator a plurality of times, and the crown oblique groove is inclined at angles of not more than 20 degrees with respect to the tire circumferential direction.

7 Claims, 8 Drawing Sheets

MOTORCYCLE TIRE

BACKGROUND OF THE INVENTION

The present invention relates to a motorcycle tire, more particularly to a combination of a tread pattern and tread profile capable of improving the rolling resistance of the tire.

In view of the recent global environmental problems such as global warming and depletion of the ozone layer, in order to improve fuel economy of the vehicles (the distance traveled per unit of fuel used), pneumatic tires are required to have low rolling resistance. This is also true of motorcycle tires.

In the US Patent Application Publication No. US-2006-207701-A1, a motorcycle tire is disclosed, wherein the tread portion is provided in its center region with a low-hysteresis-loss tread rubber having a relatively small loss tangent tan $\delta$. Therefore, heat generation of the tread rubber and energy loss during straight running are decreased, and the rolling resistance can be reduced.

In the case of such a low-hysteresis-loss tread rubber, however, there is a tendency that the road grip performance and steering stability become not so good.

On the other hand, it is conceivable to decrease the rolling resistance by using a high-modulus tread rubber in the tread portion. In this case, flexural deformation of the tread portion decreases, and the rolling resistance is decreased. But, the ride comfort and road grip performance are liable to deteriorate.

SUMMARY OF THE INVENTION

It is therefore, an object of the present invention to provide a motorcycle tire, in which the rolling resistance is reduced, without sacrificing the steering stability, ride comfort and the like.

According to the present invention, a motorcycle tire comprises a tread portion having a tread width measured axially between tread edges, wherein the tread portion is provided with a crown oblique groove disposed within a center region of the tread portion which is defined as having 30% of the tread width, the center region has a radius of curvature of from 0.60 to 0.75 times the tread width in a meridian section of the tire, and the center region has a land ratio in a range of from 0.75 to 0.95, the crown oblique groove extends continuously or discontinuously in the tire circumferential direction, across the tire equator a plurality of times, and the crown oblique groove is inclined at angles of not more than 20 degrees with respect to the tire circumferential direction.

Therefore, the crown oblique groove decreases the volume of the tread rubber in the vicinity of the tire equator and the land ratio in the center region. As a result, the center region of the tread portion is decreased in the out-of-plane bending rigidity, and thereby the energy loss due to the deformation of the tread rubber during running is decreased. Further, as the volume of the tread rubber 2G is decreased, the total amount of heat generation is lessened. Therefore, the rolling resistance is improved.

Further, since the radius of curvature of the center region of the tread portion is set in a larger range than in the conventional tires, the ground contacting area of the tread portion increases and stress is dispersed, and strain of the tread rubber is reduced. As a result, the rolling resistance can be further improved.

Since the rolling resistance can be improved without using a low hysteresis loss rubber and a high modulus rubber as the tread rubber, the deterioration of the steering stability and ride comfort due to the use of such tread rubber can be avoided.

Further, as the crown oblique groove 11 is zigzag, in comparison with a straight groove, the tread pattern rigidity against the lateral force during cornering can be increased, and the cornering performance can be improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The undermentioned footprint of the tire is that of the tire placed on a horizontal surface with a camber angle of 0 degrees under the above-mentioned normally inflated loaded condition.

BRIEF DESCRIPTION OF THE DRAWINGS

FIG. 6($a$) is a schematic cross sectional view of the tire according to the present invention under the normally inflated loaded condition.

FIG. 6($b$) is a footprint thereof.

FIG. 7($a$) is a schematic cross sectional view of a conventional tire under the normally inflated loaded condition.

FIG. 7($b$) is a footprint thereof.

FIGS. 8($a$), 8($b$) and 8($c$) show tread patterns used in the undermentioned comparative tests.

DESCRIPTION OF THE PREFERRED EMBODIMENTS

An embodiment of the present invention will now be described in detail in conjunction with accompanying drawings.

In the drawings, motorcycle tire 1 according to the present invention is so called on-road tire designed for use on wellpaved hard roads such as asphalt roads. The motorcycle tire 1 comprises a tread portion 2, a pair of axially spaced bead portions 4 each with a bead core 5 therein, a pair of sidewall portions 3 extending between the tread edges 2t and the bead portions 4, a carcass 6 extending between the bead portions 4 through the tread portion 2 and sidewall portions 3, and a tread reinforcing cord layer 7 disposed radially outside the carcass 6 in the tread portion 2.

The tread portion 2 (inclusive of the carcass 6, tread reinforcing cord layer 7 and a tread rubber 2G thereon) is curved with a relatively small radius of curvature when compared with the passenger car tires, truck/bus tires and the like, and the maximum cross section width of the tire lies between the tread edges 2t. In other words, the tread width TW (axial distance) between the tread edges 2t is equal to the maximum cross section width of the tire.

The carcass 6 is composed of at least one carcass ply 6A extending between the bead portions 4 through the tread portion 2 and sidewall portions 3, and turned up around the bead core 5 in each of the bead portions 4 from the inside to the outside of the tire so as to form a pair of turned up portions 6b and a main portion 6a therebetween. The carcass ply 6A is made of carcass cords arranged at an angle of from 75 to 90 degrees, more preferably 80 to 90 degrees with respect to the tire equator c. In this embodiment, the carcass 6 is composed of a single ply 6A of cords arranged radially at substantially 90 degrees, namely, the tire is a radial tire.

For the carcass cords, organic fiber cords, e.g. nylon, polyester, rayon and the like can be used suitably.

In each of the bead portions 4, a bead apex 8 made of hard rubber is disposed between the main portion 6a and turned up portion 6b of the carcass ply 6A.

The tread reinforcing cord layer 7 comprises at least one belt ply made of belt cords laid at an inclination angle of from 5 to 40 degrees with respect to the tire equator C. In this embodiment, the tread reinforcing layer 7 is composed of two cross breaker plies, namely, two radially inner and outer breaker plies 7A and 7B each made of parallel belt cords inclined at an angle of from 5 to 40 degrees so that the breaker cords of one ply cross those of the other ply.

For the breaker cords, steel cords, aramid fiber cords, rayon fiber cords and the like can be used suitably.

Figure 1:
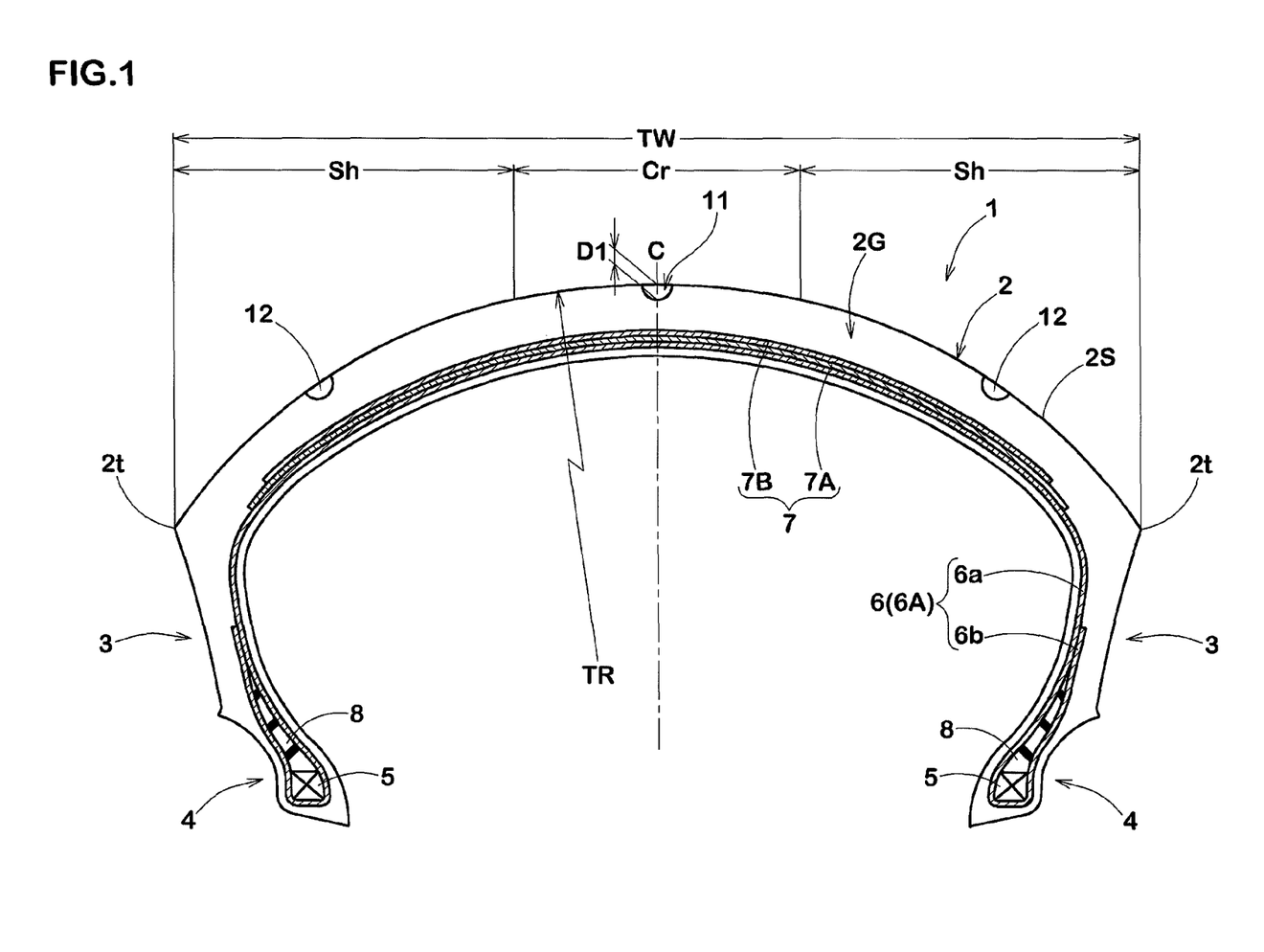
FIG. 1 is a cross sectional view of a motorcycle tire according to the present invention.

As shown in FIG. 1 which shows the motorcycle tire 1 under the normally inflated unloaded condition, the tread surface 2S or radially outer surface of the tread portion 2 between the tread edges 2t is curved like a convex arc swelling radially outwardly in order that the tire 1 can keep a relatively wide ground contacting area during cornering with a relatively large camber angle.

In the tire meridian section, as shown in FIG. 1, at least a center region Cr of the tread portion 2 is provided with a radius of curvature TR in a range of not less than 0.6 times, preferably not less than 0.65 times, but not more than 0.75 times, preferably not more than 0.7 times the tread width TW, which is larger than those of conventional tires.

The center region cr is defined as having an axial width equal to 30% of the tread width TW and centered on the tire equator c. The undermentioned shoulder region sh is a region on each side of the center region Cr having an axial width equal to 35% of the tread width TW.

In this embodiment, the substantially entirety of the tread portion 2 is provided with a single radius of curvature TR.

Figure 6A:
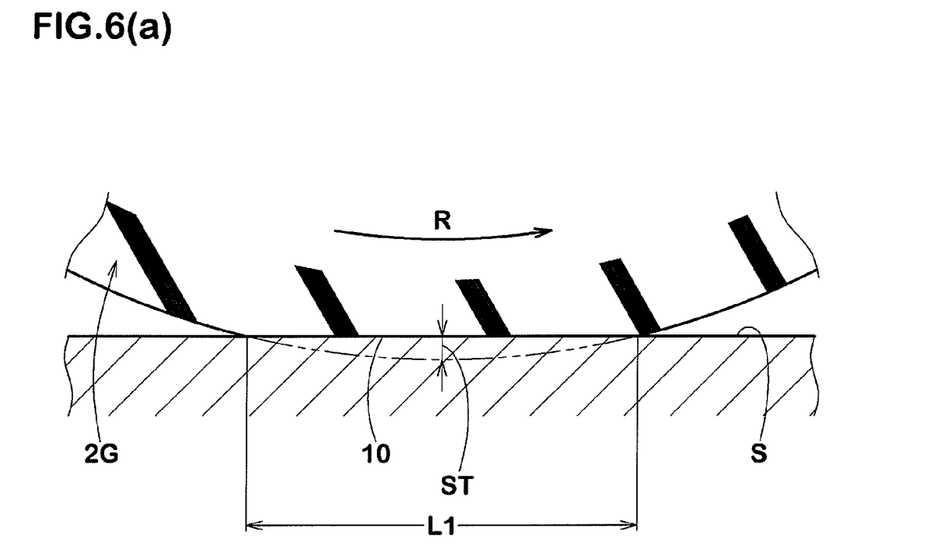
Figure 6B:
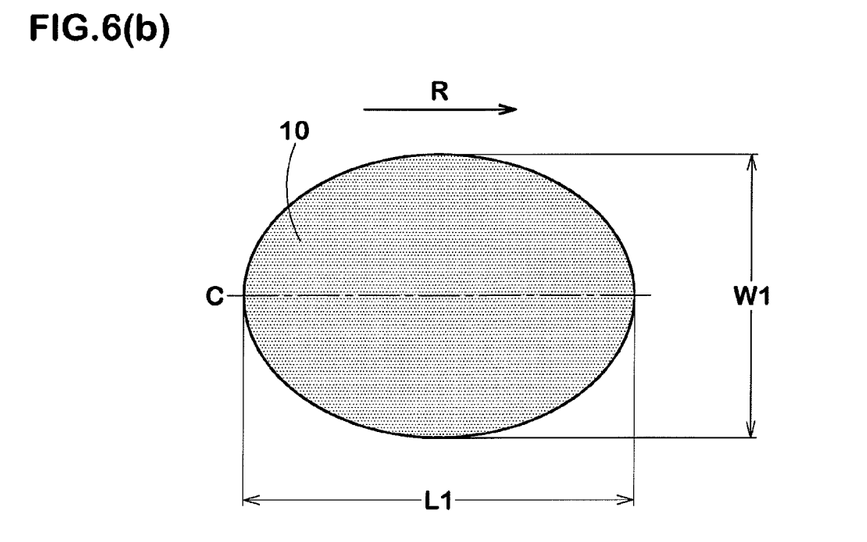
Figure 7A:
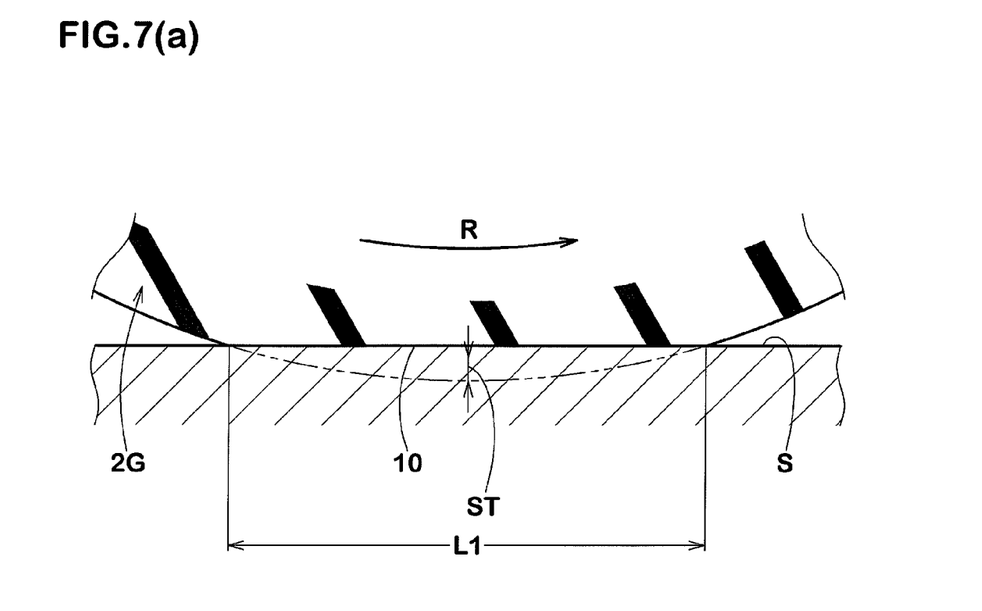
Figure 7B:
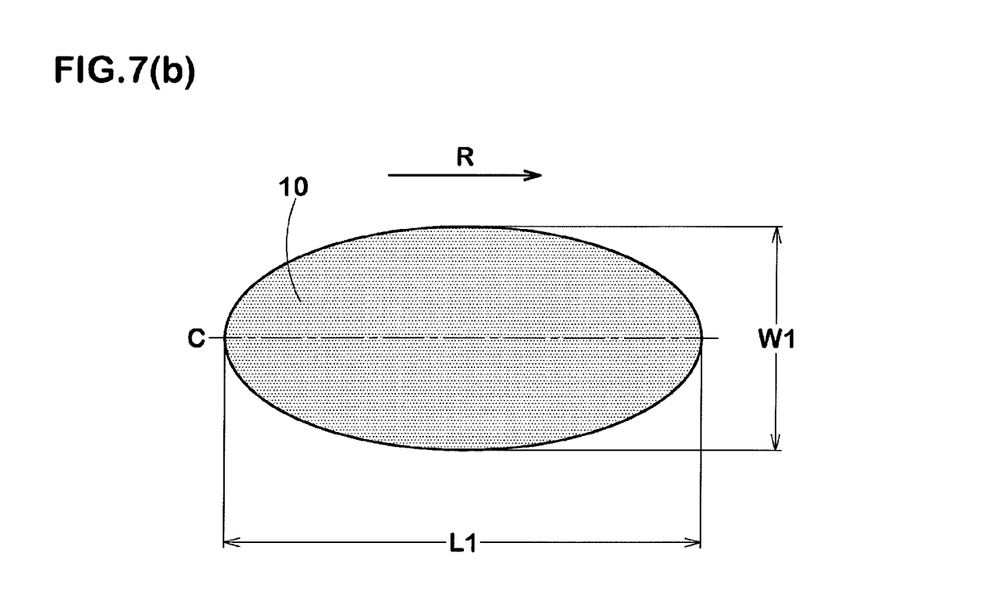
Figure 8A:
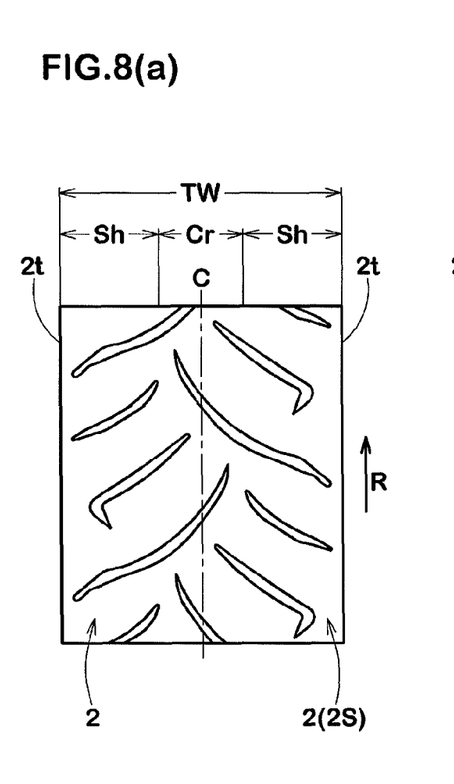
Figure 8B:
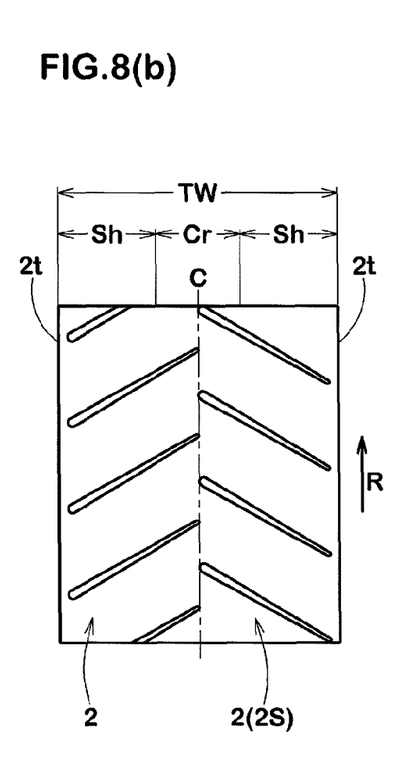
Figure 8C:
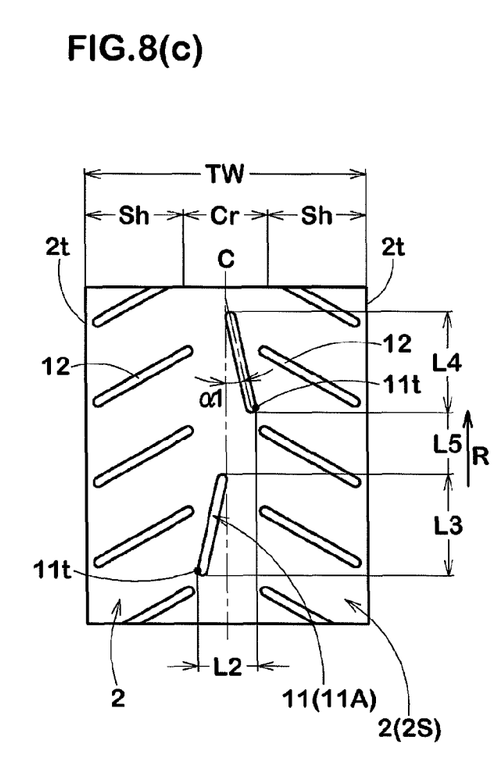

An ideal tire footprint 10 which the present invention aims at is shown in FIG. 6(b), and a typical conventional footprint is shown in FIG. 7(b).

By setting the radius of curvature TR of the tread profile as above, the tread surface 2S in the center region cr becomes relatively flat, therefore, the area of the footprint 10 of the tire according to the present invention is increased to lower the stress of the tread rubber 2G, and the strain thereof is reduced. This helps to improve the rolling resistance.

As to the shape of the footprint 10, the maximum axial width W1 of the footprint 10 becomes more than that of the conventional footprint, and the maximum circumferential length L1 of the footprint 10 becomes less than that of the conventional foot print. Accordingly, deformation of the tread portion (e.g. displacement ST of the tread rubber 2G, cf. FIG. 6(a) and FIG. 7(a)) during rolling is decreased. This also helps to improve the rolling resistance.

As shown in FIG. 6(b), regardless of the exact shape of the footprint 10, the maximum axial width W1 of the footprint 10 is set in a range of not less than 30%, preferably not less than 35%, more preferably not less than 40%, but not more than 65%, preferably not more than 60%, more preferably not more than 55% of the maximum circumferential length L1 of the footprint 10.

If the maximum axial width W1 is less than 30% of the maximum circumferential length L1, it becomes difficult to improve the rolling resistance. If the maximum axial width W1 is more than 65% of the maximum circumferential length L1, it becomes difficult to increase the camber angle, therefore, the steering stability is liable to deteriorate.

The tread portion 2 is provided in the center region Cr with a crown oblique groove 11.

It is preferable that the center region Cr is provided with no groove other than the crown oblique groove 11 in order to decrease the rolling resistance without sacrificing the steering stability. Therefore, in the undermentioned examples of the tread patterns, there is no groove other than the crown oblique groove 11.

In any case, it is preferable that the land ratio of the center region Cr is set in a range of not more than 95%, more preferably not more than 90%, but not less than 75%, more preferably not less than 80%. If the land ratio is less than 75%, the rigidity of the center region Cr in the tire axial direction is liable to become insufficient.

The land ratio is, as well known in the tire art, the ratio of the land area (=overall area−grooved area) to the overall area.

The crown oblique groove 11 is disposed within the center region Cr, without protruding from the center region Cr, and extends continuously or discontinuously in the tire circumferential direction, crossing the tire equator C a plurality of times.

The crown oblique groove 11 is inclined at angles $\alpha 1$ of not more than 20 degrees, preferably not more than 10 degrees with respect to the tire circumferential direction.

The width W2 of the crown oblique groove 11 is preferably set in a range of not less than 5 mm, more preferably not less than 6 mm, but not more than 10 mm, more preferably not more than 9 mm. The width W2 of the crown oblique groove 11 is preferably set in a range of not less than 5%, more preferably not less than 8%, but not more than 19%, more preferably not more than 16% of the footprint maximum axial width W1.

The depth D1 of the crown oblique groove 11 is preferably set in a range of not less than 4 mm, more preferably not less than 5 mm, but not more than 8 mm, more preferably not more than 7 mm. If the width W2 and depth D1 are smaller than the respective lower limits, it becomes difficult to decrease the rolling resistance. If the width W2 and groove depth D1 are larger than the respective upper limits, the steering stability is liable to deteriorate.

If the axial extent of the crown oblique groove 11 is too small, there is a possibility that the tread pattern rigidity becomes insufficient against a lateral force during cornering. If the axial extent of the crown oblique groove 11 is too wide, it becomes difficult to improve the rolling resistance. From this standpoint, the axial distance L2 between the axial outermost end points 11t of the crown oblique groove 11 (corresponding to the peak-to-peak amplitude of a zigzag groove) is preferably set in a range of not less than 5%, more preferably not less than 10%, but not more than 20%, more preferably not more than 15% of the tread width TW.

Figure 2:
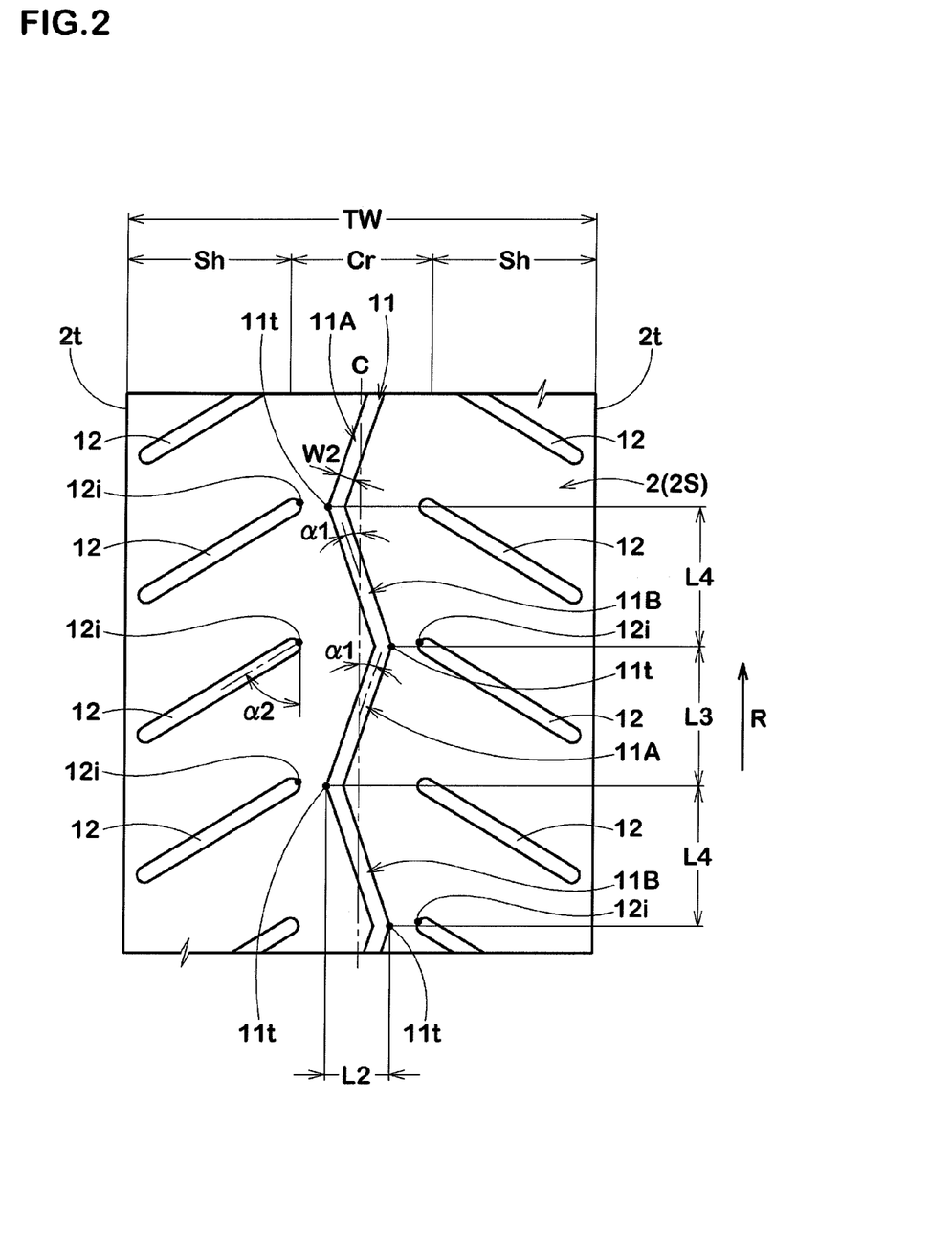
FIG. 2 is a developed view of the tread portion showing a tread pattern.

FIG. 2 shows an example of the crown oblique groove 11 extending continuously in the tire circumferential direction.

Figure 3:
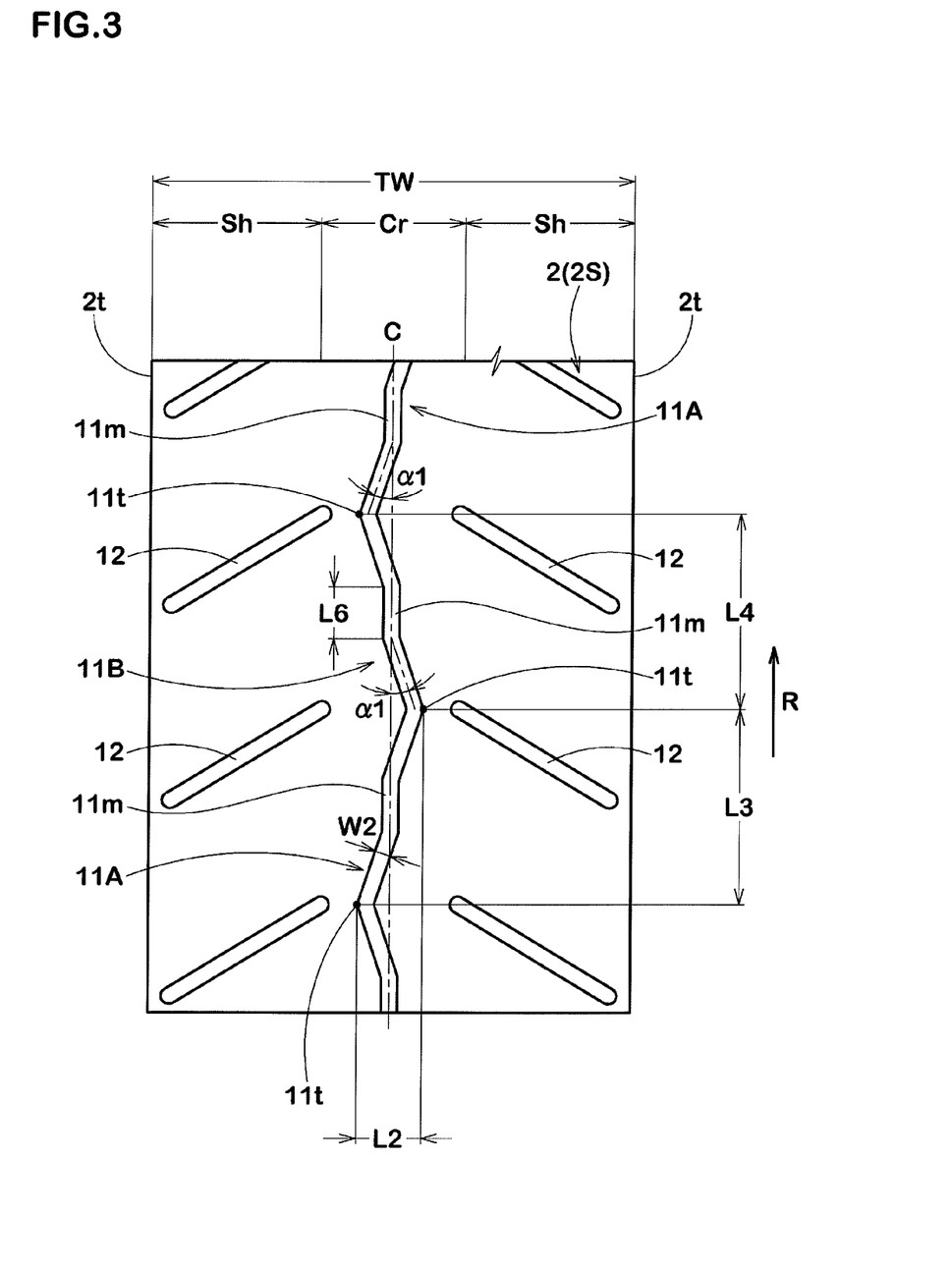
FIGS. 3, 4 and 5 each show another example of the tread pattern.

FIG. 3 shows another example of the crown oblique groove 11 extending continuously in the tire circumferential direction.

Figure 4:
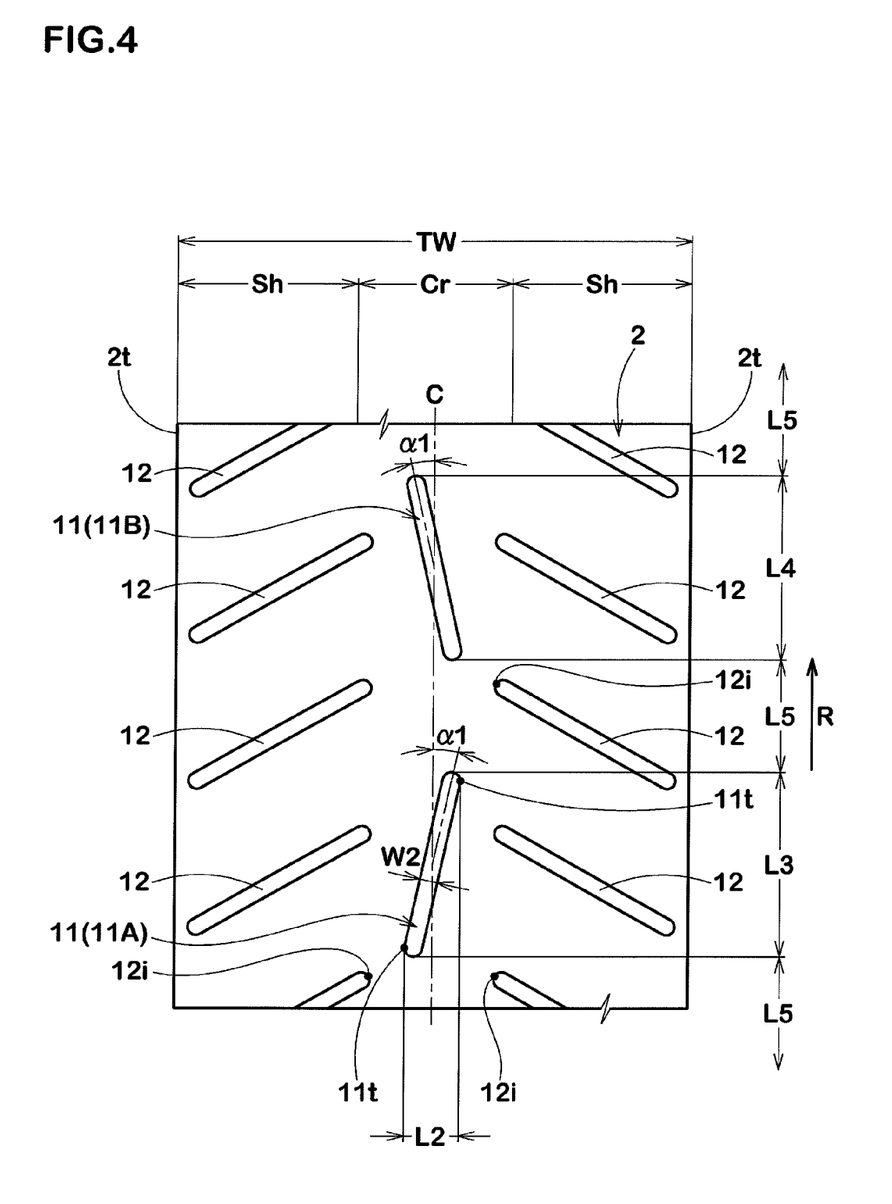

FIG. 4 shows an example of the crown oblique groove 11 extending discontinuously in the tire circumferential direction.

Figure 5:
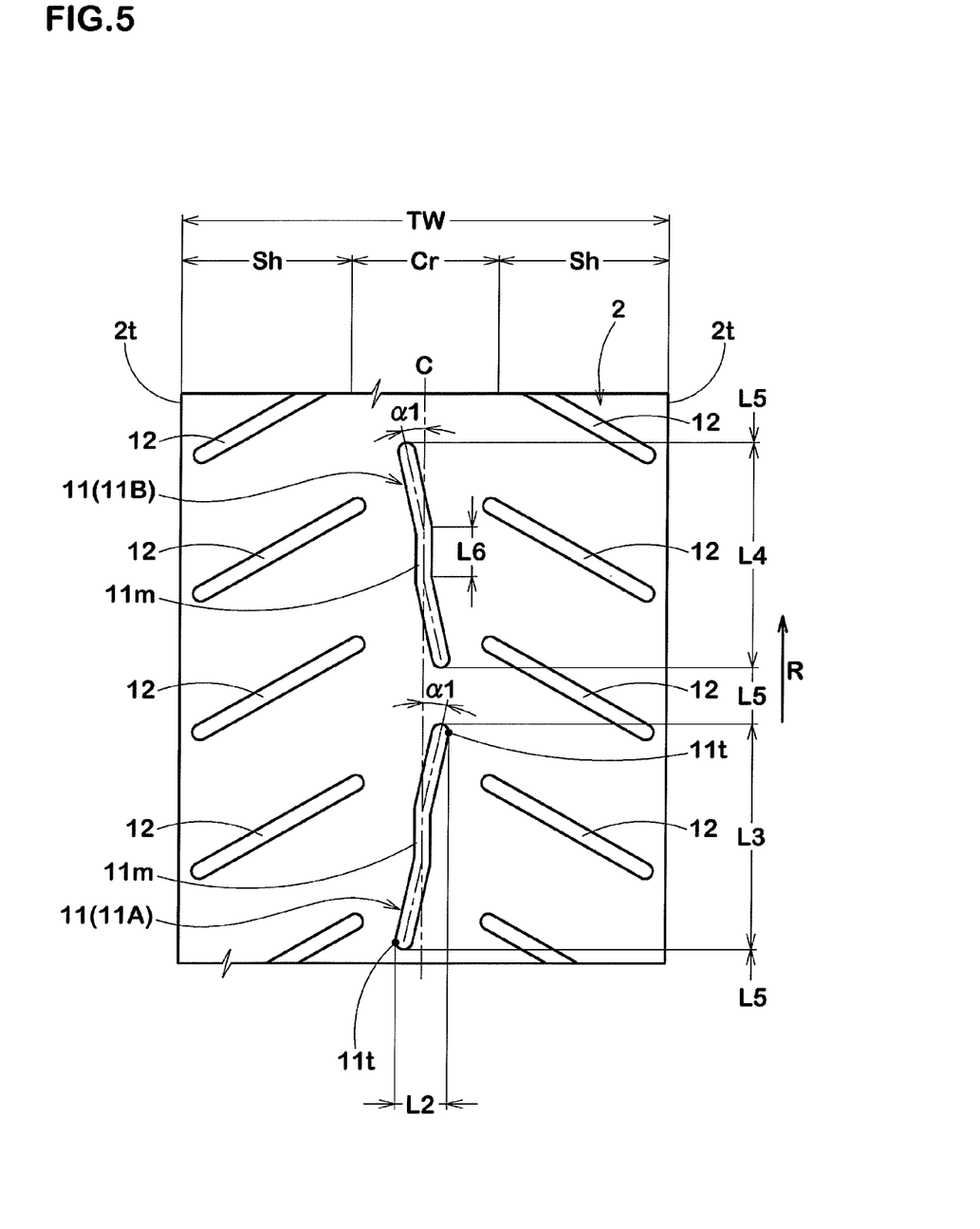

FIG. 5 shows another example of the crown oblique groove 11 extending discontinuously in the tire circumferential direction.

In the example shown in FIG. 2, the crown oblique groove 11 is made up of first oblique groove segments 11A and second oblique groove segments 11B which are alternately arranged in the longitudinal direction of the groove 11. Toward one circumferential direction, the first oblique groove segments 11A are inclined to one axial direction, and the second oblique groove segments 11B are inclined to the other axial direction. Each of the first and second oblique groove segments 11A and 11B extends straight across the tire equator.

The circumferential length L3 of each of the first oblique groove segments 11A and the circumferential length L4 of each of the second oblique groove segments 11B are set in a range of from 50 to 150 mm, and
the number of the first oblique groove segments 11A and the number of the second oblique groove segments 11B are equal to each other and set in a range of from 7 to 20.

In the example shown in FIG. 3, the crown oblique groove 11 is made up of first oblique groove segments 11A and second oblique groove segments 11B which are alternately arranged in the longitudinal direction of the groove 11. Toward one circumferential direction, the first oblique groove segments 11A are inclined to one axial direction, and the second oblique groove segments 11B are inclined to the other axial direction. The first and second oblique groove segments 11A and 11B are each provided at the midpoint thereof with a circumferential part 11m extending on the tire equator C. Therefore, each of the first and second oblique groove segments 11A and 11B extends zigzag across the tire equator. Thus, the crown oblique groove 11 appears to have a double-zigzag pattern such that one large zigzag pitch includes three small zigzag pitches.

The circumferential length L3 of each of the first oblique groove segments 11A and the circumferential length L4 of each of the second oblique groove segments 11B are set in a range of from 50 to 150 mm, and
the number of the first oblique groove segments 11A and the number of the second oblique groove segments 11B are equal to each other and set in a range of from 7 to 20.

FIG. 4 shows still another example of the crown oblique groove 11 which is a modification of the zigzag groove 11 shown in FIG. 2, wherein the straight first oblique groove segments 11A and the straight second oblique groove segments 11B are disposed at intervals of a distance L5 in the tire circumferential direction. Thus, the crown oblique groove 11 in this example is discontinuous in the tire circumferential direction, and made up of the straight oblique groove segments 11A and 11B arranged alternately in a zigzag manner.

In this example, in comparison with the continuous zigzag groove 11 shown in FIG. 2, the tread pattern rigidity is increased in the center region Cr, therefore, the cornering performance can be improved.

In the examples shown in FIG. 2 and FIG. 4, if the angles $\alpha 1$ are substantially 0 degrees with respect to the tire circumferential direction, the center region Cr decreases in the tread pattern rigidity in the tire axial direction. Therefore, the angles $\alpha 1$ of the first and second oblique groove segments 11A and 11B are set to be not less than 2 degrees, preferably not less than 4 degrees with respect to the tire circumferential direction.

FIG. 5 shows still more another example of the crown oblique groove 11 which is a modification of the zigzag groove 11 shown in FIG. 3, wherein the first oblique groove segments 11A each of which includes the circumferential part 11m, and the second oblique groove segments 11B each of which includes the circumferential part 11m, are disposed at intervals of a distance L5 in the tire circumferential direction.

Thus, the crown oblique groove 11 in this example is discontinuous in the tire circumferential direction, and made up of the non-straight oblique groove segments 11A and 11B arranged alternately in a zigzag manner.

In this example, in comparison with the continuous zigzag groove 11 shown in FIG. 3, the tread pattern rigidity is increased in the center region cr, therefore, the cornering performance can be improved.

In the examples shown in FIG. 4 and FIG. 5, if the distance L5 between the first and second oblique groove segments 11A and 11B is too short, the portions between the first and second oblique groove segments 11A and 11B are liable to break. If the distance L5 is too long, it becomes difficult to decrease the out-of-plane bending rigidity of the center region Cr, namely, difficult to reduce the rolling resistance. Therefore, the distance L5 is preferably set in a range of not less than 20 mm, more preferably not less than 30 mm, but not more than 50 mm, more preferably not more than 40 mm.

If the total circumferential length of the crown oblique groove 11, namely, the total of the circumferential lengths L3 of the first oblique groove segments 11A and the circumferential lengths L4 of the second oblique groove segments 11B is relatively too short, then it is difficult to reduce the rolling resistance. Therefore, the total circumferential length is set in a range of not less than 30%, preferably not less than 50%, more preferably not less than 70% of the circumference of the tire measured at the tire equator.

As to the above-mentioned circumferential parts 11m, it is preferable that the circumferential length L6 of the circumferential part him in each of the first and second oblique groove segments 11A and 11B is not more than 35%, preferably not more than 25%, more preferably not more than 20% of the circumferential length L3 or L4 (or overall circumferential length) of the concerned segment 11A or 11B.

If the circumferential length L6 is relatively increased, the volume of the tread rubber in the vicinity of the tire equator C is decreased, and there is a possibility that the rolling resistance is further improved. However, as the circumferential length L6 increases, the straight running stability deteriorates, therefore, it is preferable that the length L6 is at most 35%.

The above-mentioned shoulder regions Sh are each provided with shoulder grooves 12.

The shoulder grooves 12 extend from positions near but axially inside the tread edges 2t towards the tire equator, while inclining to one circumferential direction (equal to the designed intended tire rotational direction R) at angles α2 in a range of from 30 to 60 degrees with respect to the tire circumferential direction. Therefore, under wet running conditions, as the tire rotates in the intended rotational direction R, the shoulder grooves 12 can remove water existing between the tread surface 2S and road surface by leading the water toward the axially outside.

In each of the tread patters shown in FIGS. 2-5, the shoulder grooves 12 are straight grooves inclined at a constant angle α2.

In the examples in which the crown oblique groove 11 is continuous as shown in FIG. 2 and FIG. 3, the shoulder grooves 12 on each side of the tire equator are arranged at circumferential pitches each of which is substantially equal to one half of the zigzag pitch of the crown oblique groove 11, namely, (L3+L4)/2.

The axially inner ends 12i of the shoulder grooves 12 are disposed at the substantially same circumferential positions as the axially outermost end points 11t of the crown oblique groove 11, therefore, on each side of the tire equator, every other shoulder groove 12 gets close to one of the axially outermost end points 11t of the crown oblique groove 11. Such arrangement smoothens the rigidity change from the center region Cr to the shoulder regions Sh, and can improve transient characteristics of the motorcycle when banked, and the steering stability can be improved.

In the examples in which the crown oblique groove 11 is discontinuous as shown in FIG. 3 and FIG. 4, the shoulder grooves 12 on each side of the tire equator are arranged at circumferential pitches each of which is substantially equal to one-quarter of the zigzag pitch of the crown oblique groove 11, namely, (L3+L4+L5×2)/4. Thus, the number of the shoulder grooves 12 is increased to compensate for a possible decrease in the wet performance due to the discontinuity of the crown oblique groove 11.

Comparison Tests

On-road motorcycle radial tires of size 180/55R17 (tread width TW: 180 mm, tire circumference at Eq.: 1980 mm, rim size: MT5.50×17) having the structure shown in FIG. 1 and tread patterns having specifications shown in Table 1 were prepared and tested as follows.

Rolling Resistance Test:

Using an indoor tire tester, the rolling resistance of each tire was measured under the following conditions:
tire pressure: 290 kPa
tire load: 1.8 kN
running speed: 80 km/h The results are shown in Table 1 by an index based on Ref. 1 being 100, wherein the smaller the value, the lower the rolling resistance.

Running Test on Test Course:

A 1300 cc motorcycle provided on both of the front wheel and rear wheel with the same test tires inflated to 290 kPa was run on a test circuit course, and the test rider evaluated the steering stability and ride comfort.

The results are shown in Table 1 by an index based on Ref. 1 being 100, wherein the larger the value, the better the performance.

From the test results, it was confirmed that the rolling resistance and ride comfort can be improved without sacrificing the steering stability.

TABLE 1

| Tire | Ref. 1 | Ref. 2 | Ref. 3 | Ex. 1 | Ex. 2 | Ex. 3 | Ex. 4 | Ex. 5 | Ref. 4 | Ex. 6 |
|---|---|---|---|---|---|---|---|---|---|---|
| Tread pattern (No. of Fig.) | 8(a) | 8(b) | 8(c) | 2 | 2 | 2 | 2 | 2 | 2 | 4 |
| Center region | | | | | | | | | | |
| land ratio (%) | 88 | 90 | 88 | 85 | 84 | 83 | 82 | 81 | 80 | 90 |
| radius of curvature TR (mm) | 120 | 120 | 120 | 120 | 120 | 120 | 120 | 120 | 120 | 120 |
| ratio (TR/TW) | 0.67 | 0.67 | 0.67 | 0.67 | 0.67 | 0.67 | 0.67 | 0.67 | 0.67 | 0.67 |
| Footprint | | | | | | | | | | |
| max. width W1 (mm) | 63 | 63 | 63 | 63 | 63 | 63 | 63 | 63 | 63 | 63 |
| max. length L1 (mm) | 118 | 118 | 118 | 118 | 118 | 118 | 118 | 118 | 118 | 118 |
| ratio (W1/L1) (%) | 53 | 53 | 53 | 53 | 53 | 53 | 53 | 53 | 53 | 53 |
| Crown main groove | | | | | | | | | | |
| angle α1 (deg.) | — | — | 10 | 0 | 5 | 10 | 15 | 20 | 25 | 0 |
| width W2 (mm) | — | — | 8 | 8 | 8 | 8 | 8 | 8 | 8 | 8 |
| ratio (W2/W1) (%) | — | — | 13 | 13 | 13 | 13 | 13 | 13 | 13 | 13 |
| depth D1 (mm) | — | — | 6.5 | 6.5 | 6.5 | 6.5 | 6.5 | 6.5 | 6.5 | 6.5 |
| distance L2 (mm) | — | — | 44 | 8 | 17 | 25 | 33 | 40 | 47 | 8 |
| ratio (L2/TW) (%) | — | — | 24 | 4 | 9 | 14 | 18 | 22 | 26 | 4 |
| total circum. length (mm) | — | — | 1280 | 1980 | 1980 | 1980 | 1980 | 1980 | 1980 | 1630 |
| total circum. length/tire circumference (%) | — | — | 65 | 100 | 100 | 100 | 100 | 100 | 100 | 82 |
| distance L5 between segments (mm) | 0 | 0 | 45 | 0 | 0 | 0 | 0 | 0 | 0 | 25 |
| length L6 of circumferential part (mm) | 0 | 0 | 0 | 0 | 0 | 0 | 0 | 0 | 0 | 0 |
| Rolling resistance | 100 | 100 | 99 | 95 | 95 | 95 | 96 | 97 | 99 | 96 |
| Steering stability | 100 | 100 | 99 | 98 | 99 | 99 | 99 | 98 | 98 | 97 |
| Ride comfort | 100 | 99 | 102 | 100 | 102 | 102 | 103 | 103 | 103 | 102 |

| Tire | Ex. 7 | Ex. 8 | Ex. 9 | Ex. 10 | Ref. 5 | Ex. 11 | Ex. 12 | Ex. 13 | Ex. 14 | Ex. 15 |
|---|---|---|---|---|---|---|---|---|---|---|
| Tread pattern (No. of Fig.) | 4 | 4 | 4 | 4 | 4 | 2 | 2 | 2 | 2 | 2 |
| Center region | | | | | | | | | | |
| land ratio (%) | 89 | 88 | 87 | 86 | 85 | 94 | 89 | 79 | 75 | 60 |
| radius of curvature TR (mm) | 120 | 120 | 120 | 120 | 120 | 120 | 120 | 120 | 120 | 120 |
| ratio (TR/TW) | 0.67 | 0.67 | 0.67 | 0.67 | 0.67 | 0.67 | 0.67 | 0.67 | 0.67 | 0.67 |
| Footprint | | | | | | | | | | |
| max. width W1 (mm) | 63 | 63 | 63 | 63 | 63 | 63 | 63 | 63 | 63 | 63 |
| max. length L1 (mm) | 118 | 118 | 118 | 118 | 118 | 118 | 118 | 118 | 118 | 118 |
| ratio (W1/L1) (%) | 53 | 53 | 53 | 53 | 53 | 53 | 53 | 53 | 53 | 53 |

TABLE 1-continued

| Crown main groove | | | | | | | | | | |
|---|---|---|---|---|---|---|---|---|---|---|
| angle α1 (deg.) | 5 | 10 | 15 | 20 | 25 | 10 | 10 | 10 | 10 | 10 |
| width W2 (mm) | 8 | 8 | 8 | 8 | 8 | 3 | 5 | 10 | 12 | 19 |
| ratio (W2/W1) (%) | 13 | 13 | 13 | 13 | 13 | 5 | 8 | 16 | 19 | 30 |
| depth D1 (mm) | 6.5 | 6.5 | 6.5 | 6.5 | 6.5 | 6.5 | 6.5 | 6.5 | 6.5 | 6.5 |
| distance L2 (mm) | 15 | 22 | 29 | 36 | 43 | 20 | 22 | 27 | 29 | 36 |
| ratio (L2/TW) (%) | 8 | 12 | 16 | 20 | 24 | 11 | 12 | 15 | 16 | 20 |
| total circum. length (mm) | 1560 | 1490 | 1420 | 1350 | 1280 | 1980 | 1980 | 1980 | 1980 | 1980 |
| total circum. length/tire circumference (%) | 79 | 75 | 72 | 68 | 65 | 100 | 100 | 100 | 100 | 100 |
| distance L5 between segments (mm) | 30 | 35 | 40 | 45 | 50 | 0 | 0 | 0 | 0 | 0 |
| length L6 of circumferential part (mm) | 0 | 0 | 0 | 0 | 0 | 0 | 0 | 0 | 0 | 0 |
| Rolling resistance | 96 | 97 | 97 | 98 | 99 | 98 | 97 | 93 | 92 | 90 |
| Steering stability | 99 | 99 | 99 | 98 | 97 | 100 | 99 | 98 | 93 | 85 |
| Ride comfort | 102 | 102 | 102 | 102 | 102 | 100 | 102 | 105 | 107 | 110 |

| Tire | Ref. 6 | Ex. 16 | Ex. 17 | Ex. 18 | Ref. 7 | Ref. 8 | Ex. 19 | Ex. 20 | Ref. 9 | Ex. 21 | Ex. 22 |
|---|---|---|---|---|---|---|---|---|---|---|---|
| Tread pattern (No. of Fig.) | 4 | 4 | 4 | 4 | 2 | 2 | 2 | 2 | 2 | 3 | 5 |
| Center region | | | | | | | | | | | |
| land ratio (%) | 96 | 94 | 85 | 82 | 83 | 83 | 83 | 83 | 83 | 85 | 90 |
| radius of curvature TR (mm) | 120 | 120 | 120 | 120 | 90 | 100 | 110 | 135 | 140 | 120 | 120 |
| ratio (TR/TW) | 0.67 | 0.67 | 0.67 | 0.67 | 0.50 | 0.56 | 0.61 | 0.75 | 0.78 | 0.67 | 0.67 |
| Footprint | | | | | | | | | | | |
| max. width W1 (mm) | 63 | 63 | 63 | 63 | 48 | 53 | 58 | 70 | 73 | 63 | 63 |
| max. length L1 (mm) | 118 | 118 | 118 | 118 | 130 | 126 | 122 | 112 | 110 | 118 | 118 |
| ratio (W1/L1) (%) | 53 | 53 | 53 | 53 | 37 | 42 | 48 | 63 | 66 | 53 | 53 |
| Crown main groove | | | | | | | | | | | |
| angle α1 (deg.) | 10 | 10 | 10 | 10 | 10 | 10 | 10 | 10 | 10 | 10 | 10 |
| width W2 (mm) | 3 | 5 | 10 | 12 | 8 | 8 | 8 | 8 | 8 | 8 | 8 |
| ratio (W2/W1) (%) | 5 | 8 | 16 | 19 | 13 | 13 | 13 | 13 | 13 | 13 | 13 |
| depth D1 (mm) | 6.5 | 6.5 | 6.5 | 6.5 | 6.5 | 6.5 | 6.5 | 6.5 | 6.5 | 6.5 | 6.5 |
| distance L2 (mm) | 17 | 19 | 24 | 26 | 25 | 25 | 25 | 25 | 25 | 22 | 20 |
| ratio (L2/TW) (%) | 9 | 11 | 13 | 14 | 14 | 14 | 14 | 14 | 14 | 12 | 11 |
| total circum. length (mm) | 1490 | 1490 | 1490 | 1490 | 1980 | 1980 | 1980 | 1980 | 1980 | 1980 | 1490 |
| total circum. length/tire circumference (%) | 75 | 75 | 75 | 75 | 100 | 100 | 100 | 100 | 100 | 100 | 75 |
| distance L5 between segments (mm) | 35 | 35 | 35 | 35 | 0 | 0 | 0 | 0 | 0 | 0 | 35 |
| length L6 of circumferential part (mm) | 0 | 0 | 0 | 0 | 0 | 0 | 0 | 0 | 0 | 50 | 35 |
| Rolling resistance | 99 | 98 | 95 | 94 | 100 | 99 | 98 | 90 | 85 | 92 | 95 |
| Steering stability | 100 | 99 | 97 | 95 | 98 | 99 | 99 | 95 | 85 | 99 | 100 |
| Ride comfort | 100 | 101 | 102 | 103 | 102 | 102 | 102 | 101 | 101 | 104 | 103 |

The invention claimed is:

1. A motorcycle tire comprising
a tread portion having a tread width as measured axially between tread edges,
the tread portion provided with a crown oblique groove disposed within a center region of the tread portion which region is defined as having 30% of the tread width,
in a meridian section of the tire, the center region having a radius of curvature of from 0.60 to 0.75 times the tread width,
the center region having a land ratio in a range of from 0.75 to 0.95,
the crown oblique groove extending continuously or discontinuously in the tire circumferential direction, across the tire equator a plurality of times, and
the crown oblique groove inclined at angles of not more than 20 degrees with respect to the tire circumferential direction,
wherein
the crown oblique groove is made up of oblique groove segments each extending straight across the tire equator, and
the tread portion is provided on each side of the center region with shoulder grooves,
the shoulder grooves are substantially straight grooves inclined towards one circumferential direction at a substantially constant angle in the range of 30 to 60 degrees with respect to the tire circumferential direction, wherein
the crown oblique groove is discontinuous, and
the shoulder grooves on each side of the tire equator are arranged at circumferential pitches each of which is substantially equal to one-quarter of a zigzag pitch (L3+L4+L5×2) of the crown oblique groove.

2. The motorcycle tire according to claim 1, wherein the crown oblique groove has a groove width of from 5 to 10 mm.

3. The motorcycle tire according to claim 1, wherein the tread portion has a footprint whose aspect ratio defined as the ratio of its maximum axial width to maximum circumferential length is in a range of from 0.30 to 0.65.

4. The motorcycle tire according to claim 1, wherein the center region is provided with no groove other than the crown oblique groove.

5. The motorcycle tire according to claim 1, wherein the axial distance between the axial outermost end of the crown oblique groove on one side of the tire equator and the axial outermost end of the crown oblique groove on the other side of the tire equator is in a range of from 5 to 20% of the tread width.

6. The motorcycle tire according to claim 1, wherein the tread portion is provided with no groove other than the crown oblique groove and the shoulder grooves.

7. The motorcycle tire according to claim 1, wherein the shoulder grooves are straight grooves having substantially same lengths, and the shoulder grooves terminate without being connected to the crown oblique groove.

* * * * *